United States Patent
Lee et al.

(10) Patent No.: US 6,535,493 B1
(45) Date of Patent: *Mar. 18, 2003

(54) MOBILE INTERNET COMMUNICATION PROTOCOL

(75) Inventors: Frances Lee, San Jose, CA (US); Gregory Ennis, Los Gatos, CA (US)

(73) Assignee: Symbol Technologies, Inc., Holtsville, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/007,578

(22) Filed: Jan. 15, 1998

(51) Int. Cl.[7] .................................................. H04Q 7/00
(52) U.S. Cl. ...................... 370/329; 370/338; 455/432; 455/435; 455/456
(58) Field of Search .................. 370/349, 326, 370/338, 329; 455/432, 435, 456

(56) References Cited

U.S. PATENT DOCUMENTS

| | | | |
|---|---|---|---|
| 5,029,183 A | | 7/1991 | Tymes ............................ 375/1 |
| 5,103,461 A | | 4/1992 | Tymes ............................ 375/1 |
| 5,159,592 A | | 10/1992 | Perkins ......................... 370/85 |
| 5,280,498 A | | 1/1994 | Tymes et al. .................... 375/1 |
| 5,325,362 A | * | 6/1994 | Aziz ........................... 370/94.3 |
| 5,418,812 A | | 5/1995 | Reyes et al. ..................... 375/1 |
| 5,479,441 A | | 12/1995 | Tymes et al. ................... 375/200 |
| 5,528,621 A | | 6/1996 | Heiman et al. ................. 375/200 |
| 5,629,975 A | * | 5/1997 | Tiedemann, Jr. et al. ......... 379/60 |
| 5,668,803 A | | 9/1997 | Tymes et al. ................... 370/312 |
| 5,737,328 A | * | 4/1998 | Norman et al. ................. 370/331 |
| 5,850,390 A | * | 12/1998 | Ramel .......................... 370/330 |
| 5,875,186 A | * | 2/1999 | Belanger ....................... 370/331 |
| 5,970,059 A | * | 10/1999 | Ahopelto et al. ............... 370/338 |
| 6,049,533 A | * | 4/2000 | Norman et al. ................. 370/328 |
| 6,144,671 A | * | 11/2000 | Perinpanathan et al. ........... 370/409 |

OTHER PUBLICATIONS

Spectrum24 Wireless LAN, Symbol, product information, 5 pgs. May 1997.

PPT 4500 Series, Portable Pen Terminals, Symbol, product information, 10/97.

Spectrum24 Pager, Instant Response to Critical On–site Communications, Symbol, product information, 9/97.

PDT 3200 Series, Portable Data Terminals, Symbol, product information, 9/97.

(List continued on next page.)

*Primary Examiner*—Alpus H. Hsu
*Assistant Examiner*—Roberta Stevens
(74) *Attorney, Agent, or Firm*—Fish & Richardson P.C.

(57) ABSTRACT

An apparatus and a method route information to a mobile unit in a data communications system having a home network and a remote network. Each of the home and remote networks supports one or more mobile units and one or more stationary access points. The mobile unit has a unique address and may roam from the home network to the remote network. The mobile unit associates with one access point which serves as a home agent. When the mobile unit roams and is away from its home network, the apparatus discovers a physical location of the mobile unit by sending an agent advertisement packet from the access point. If the location of the mobile unit is not at the home network, the apparatus associates the mobile unit with one of the access points on the foreign network which serves as a foreign agent. Next, the apparatus registers the mobile unit with the home agent, encapsulates original data received by the home agent which is destined for the mobile unit, forwards encapsulated data to the foreign agent, and converts the encapsulated data to the original data and delivers the original data to the mobile unit via the foreign agent.

22 Claims, 9 Drawing Sheets

OTHER PUBLICATIONS

Dave Raggett, "Inserting Objects into HTML," W3C Reports, WWW Journal, pp. 29–41, Apr. 22, 1996.

"Designing TCP/IP Subnetworks," Loran International Technologies, www.loran.com, pp. 1–8, Dec. 1997.

Ch. Perkins et al., "Route Optimization in Mobile IP," Internet Draft, pp. 1–21, Jan. 1998.

R.M. Hinden, "IP Next Generation Overview," Ipsilon Networks, WWW, pp. 1–18, May 14, 1995.

* cited by examiner

MOBILE INTERNET COMMUNICATION PROTOCOL

BACKGROUND

The present invention relates to an apparatus and a method to provide wireless communications for computers, and more particularly, to an apparatus and a method to provide wireless communications for computers roaming over a wide area network.

Rapid advances in electronics have given rise to powerful mobile computers capable of performing tasks reserved for room-sized computers of the past. The functionality of these mobile computers is further enhanced by advances in telecommunication technology which enable these mobile computers to communicate with each other and to access data in an untethered manner.

Conventionally, messages may be sent as a sequence of data packets onto a communication system. The data packets may be formed at a high level of the communication protocol. Each packet is transferred to a transport layer, which passes the packet to a network layer. The network layer attaches another header called a network layer header to the data packet, and then passes the packet to a data link layer. The data link layer in turn attaches another header, a data link layer header, to the data packet. The packet is eventually transmitted to the communication system using a physical layer such as a copper wire or a wireless transceiver.

Typically, the communication system is divided into a number of links. A link may be a local area network (LAN) which is capable of supporting a few hundred nodes where computers may be attached. The LANs are connected together by a number of different devices which forward the packets to their destinations. Other types of links in a communication system may include a wide area network (WAN) formed by joining LANs, or by directly joining computers in a point-to-point connection. The packet, once transmitted onto the communication system, is forwarded from link to link until it reaches its destination end station.

One protocol which supports an interconnection of LANs is called an Internet Protocol (IP). The IP is designed to interconnect packet switched communication LANs to form an internetwork. Using the IP, blocks of data called Internet datagrams may be transmitted from sources to destinations throughout the Internet.

Additionally, a Transmission Control Protocol (TCP), a transport protocol which provides connection-oriented, end-to-end data transmission using packet switched communication LANs, is typically used with the IP as a routable protocol which networked computers use to access each other either locally on the same broadcast domain or remotely through a router. A TCP/IP packet is sent by a source station to a destination station by placing the IP address of the destination station in the destination address field of the TCP/IP packet. Similarly, the IP address of the source station is placed in the source address field of the TCP/IP packet. In the LANs, a TCP/IP packet is encapsulated within a Media Access Control (MAC)-layer frame and transmitted on a physical network. The MAC-layer frame that encapsulates the TCP/IP packet in turn has a MAC layer source address and destination address of its own. The MAC-layer destination address that is in the outgoing frame is either the MAC layer address for a router that is connected to the local broadcast domain of the source station (for remote stations, i.e. stations that are not connected to the same broadcast domain as the source station), or the MAC layer address of the destination (for local stations i.e. stations that are connected to the same broadcast domain as the source station).

The TCP/IP protocol identifies a computer on the network via a globally unique IP address. The TCP/IP protocol distinguishes between addresses that are local (on the same broadcast domain) and remote (accessed via a router) by dividing the entire Internet wide area network into smaller subnetworks. A TCP/IP subnetwork can either contain more subnetworks or may terminate at stations such as mobile computers, personal computers, workstations or printers.

A TCP/IP subnetwork mask is employed to determine if the destination IP address is that of either a local or a remote station in the following manner. Both the destination and source IP addresses are logically ANDed with the subnet mask. If the results of the operation are the same for both the destination and source IP addresses, then the source and destination stations are connected to the same broadcast domain and the destination station is a local station. Otherwise, the destination station is not connected to the same broadcast domain as the destination station and is a remote station. If the destination station is determined to be a local station, the source station determines the MAC address of the destination station and transmits the frame directly to the destination station via their common broadcast domain. If the destination station is determined to be a remote station, the source station will determine the MAC address of a default router (by which remote stations can be reached) and transmits the frame to the default router, which forwards it to the destination station via a routing network.

The ability to identify a computer on the network via a globally unique IP address allows the Internet to act as a global WAN. However, the IP was originally developed with an assumption that users are assigned to unique Internet addresses which would be connected to networks at essentially fixed locations: the IP address of a unit identifies the unit's point of attachment to the network. Datagrams are routed to the unit according to the location information contained in the IP header. However, if the mobile unit changes its point of attachment without changing its IP address, datagrams destined to it would become undeliverable. Further, if the unit changes its IP address when it moves to a new network, the unit would lose the connection. The limitation becomes intolerable for mobile units such as portable and hand-held computers migrating about the network.

SUMMARY OF THE INVENTION

The invention provides an apparatus and a method of routing information to a mobile unit in a data communications system having a home network and a remote network. Each of the home and remote networks supports one or more mobile units and one or more stationary access points. The mobile unit has a unique address and may roam from the home network to the remote network. The mobile unit associates with one access point which serves as a home agent. When the mobile unit roams and is away from its home network, the apparatus discovers a physical location of the mobile unit by sending an agent advertisement packet from the access point. If the location of the mobile unit is not at the home network, the apparatus associates the mobile unit with one of the access points on the foreign network which serves as a foreign agent. Next, the apparatus registers the mobile unit with the home agent, encapsulates original data received by the home agent which is destined for the mobile unit, forwards encapsulated data to the foreign agent, and converts the encapsulated data to the original data and delivers the original data to the mobile unit via the foreign agent.

In one aspect, the mobile unit association is performed by handshaking with one of the access points on the remote network and by receiving an agent advertisement packet from the handshaked access point. A registration request packet is generated and sent to the handshaked access point. If the registration request packet is granted, the apparatus selects the access point as the foreign agent.

In another aspect, a predetermined access point is selected as the home agent if the mobile unit is first activated on the foreign network. Alternatively, one of the access points on the home network is selected as the home agent when the mobile unit is initially activated on the home network.

In yet another aspect, the apparatus disassociates mobile units that do not periodically request registrations from its active list. This is done by waiting until a registration expires on the access point. If the access point is serving as the home agent, the apparatus removes the reference to the mobile unit from a home agent table and if the access point is serving as the foreign agent, the apparatus removes the reference to the mobile unit from a foreign agent table.

In yet another aspect, the mobile unit is registered by providing a care-of address associated with the foreign agent to the home agent. During the registration request process, if the access point is acting as the foreign agent, the apparatus relays the request to the home agent. If the access point is acting as the home agent, the apparatus updates the reference to the mobile unit in the home agent table.

In yet another aspect, a registration reply is sent to the mobile unit. The process determines whether the access point is acting as a foreign agent and if so, adds the reference to the mobile unit in a foreign agent table and relays the registration reply to the mobile unit.

In yet another aspect, the apparatus removes the mobility support when the mobile unit returns to the home network.

In yet another aspect, text data, voice data, video data, and image data may be forwarded by the apparatus to the roaming mobile unit.

Advantages of the invention include the following. The mobile unit may freely roam about even though it is assigned to a unique, fixed Internet address tied to a fixed location. Datagrams are automatically routed to the unit anywhere in the world where corresponding local networks are available, regardless of its position. Datagrams destined for the roaming unit would be delivered, even though the unit may have roamed outside of its home port. Moreover, the unit does not need to change its IP address when it moves to a new network. Thus, the fixed IP address is retained to ensure compatibility with existing protocols. Further, the mobility support capability is provided without requiring changes to the mobile unit.

DESCRIPTION

Figure 1:
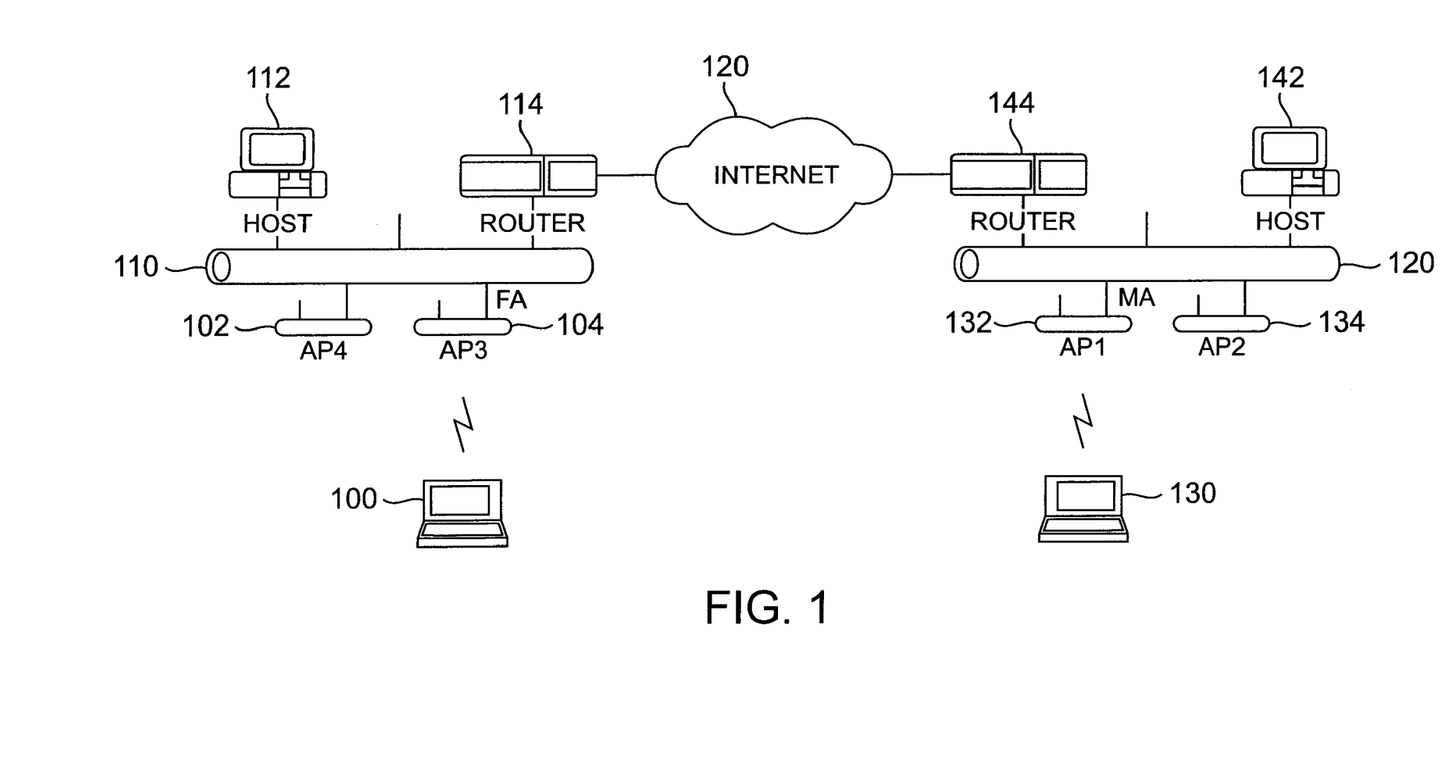
FIG. 1 is a schematic illustration of a wide area system which is connected by using an Internet.

Referring to FIG. 1, a wide-area communication network according to one embodiment of the invention is illustrated. One or more mobile units 100 wirelessly communicate with one or more base stations or access points (APs) 102 and 104. The APs 102 and 104 in turn are connected to a LAN 110 and a LAN 140, respectively. The APs 102 and 104 may be either LAN interface cards or standalone devices that transmit the LAN traffic between the wired and wireless portions of the network. The physical area over which an access point can transmit wireless communications is called a cell. The APs 102 and 104 may communicate with the mobile unit 100 via radio frequency (RF) transmissions or via infrared (IR) transmissions. RF based solutions may be limited in their transmission range in order to conserve energy. Infrared solutions cannot penetrate opaque barriers. Thus, even with a diffused infrared system, a cell may be limited to a single room. To provide greater coverage, multiple cells with APs 102 and 104 in a network may be linked to provide the mobile node 100 with an ability to freely roam from cell to cell.

Attached to the LAN 110 is a host computer 112 and a router 114. The router 114 receives packets from the LAN 110 and routes the packets to a second router 144 over an Internet 120. The Internet 120 represents a shift in communication technology, for data packets may be sent between routers 114 and 144 over long distances crossing state and national boundaries at essentially a fixed cost. Once the data packets are received by the router 144, the data packets in turn are transferred into a second LAN 140. Attached to the second LAN 140 is a host computer 142 as well as a plurality of base stations or APs 132–134. The base stations 132–134 in turn communicate via wireless links to a second mobile unit 130.

In one embodiment, the mobile units 100 and 130 may be laser-scanned, bar code readers of the hand held, battery-operated type as disclosed in U.S. Pat. Nos. 4,387,297, 4,409,470 or 4,760,248, all assigned to Symbol Technologies, Inc., and hereby incorporated by reference. Additionally, the mobile nodes 100 and 130 may be of the type disclosed in application Ser. No. 08/916,605 entitled "HAND-HELD OPTICAL READER TERMINAL WITH ERGONOMIC DESIGN", filed on Aug. 22, 1997, assigned to Symbol Technologies, Inc., and hereby incorporated by reference. Various other types of remote terminals or hand held computers may be used. These remote terminals ordinarily would include data entry facilities such as a keyboard, as well as a display or a hard copy device for presenting information to a user. Although hand held, laser-scan type bar code readers are mentioned, the mobile nodes 100 may also be wand type bar code readers. Further, the mobile units 100 and 130 may be an optical character recognition (OCR) type as well. Other types of data may be gathered by sensors on the mobile units 100 and 130, including temperature or pressure sensors, event counters, voice 10 or sound activated devices, and intrusion detectors, among others.

The mobile nodes 100 and 130 can communicate with one of APs 102, 104, 132 and 134 using wireless transmissions such as a Spectrum-24 wireless LAN, available from Symbol Technologies, Inc. The wireless network may be a frequency hopping spread spectrum cellular network designed to operate within a 2.4–2.5 gigahertz (GHz) band. Additionally, to ensure interoperability, the network may conform to various wireless LAN standards, including an IEEE 802.11 standard. The standard covers Direct Sequence Spread Spectrum (DSSS), which spreads parts of a message across an available frequency range; Frequency Hopping Spread Spectrum (FHSS), which transmits a short burst on one frequency, then hops to another frequency for the next burst; or infrared technology as the physical transport layer in the 2.4 GHz band. A main objective of the standard is to enable interoperability at the physical layer between mobile clients and access points using the same transmission technique. Because the protocols that allow for seamless roaming among cells are beyond the scope of the standard, customers may need to rely on a single manufacturer for their access points and software when the mobile unit roams about, even though the IEEE 802.11 standard will let them use other vendors' adapters to communicate between mobile units and access points.

To support roaming, a management facility within each of APs 102, 104, 132, and 134 handles event-driven tasks at a multi-tasking level. The facility modifies the AP's packet forwarding routines to tunnel datagrams when the AP acts as a home agent and to detunnel datagrams when the AP acts as a foreign agent. The tunneling and detunneling processes are specified in a standard called a RFC2003 standard, entitled "IP Encapsulation within IP."

The facility within the AP 102, 106, 132 and 134 generates a packet using a predetermined protocol such as a Wireless Network Management Protocol(WNMP) packet. The packet is of a type called "Agent Advertisement" whenever a mobile unit 100 associates with the respective AP. The Agent Advertisement packet is sent directly to the mobile unit 100 to determine whether the mobile unit 100 is still connected to its home subnet and to detect whether the mobile unit 100 has moved from one subnet to another. The format of one embodiment of an Agent Advertisement packet is as follows:

Header Fields
   Destination Address—a MAC address of the mobile unit
   Source Address—a MAC address of the mobility agent
   Ethernet Type—0x8781
   Message Type—60
Element
   4 bytes—An IP address of the mobility agent
   4 bytes—A care-of address which will be used for tunneling Correspondingly, a facility within the mobile unit 100 generates a WNMP packet of type called "Agent Solicitation" only when it has not received the Agent Advertisement packet from its associated AP. The mobile unit 100 retries up to three times at a predetermined rate such as one transmission per second. The format of an Agent Solicitation packet is defined as follows:

Header Fields
   Destination Address—a MAC address of the associated AP
   Source Address—a MAC address of the mobile unit
   Ethernet Type—0x8781
   Message Type—61
Element
   4 bytes—an IP address of the mobile node Roaming, or the movement of the mobile node 100 or 130 can occur within the subnet or across routers to another subnet. Datagrams sent from the mobile unit 100 requires no tunneling support because IP datagrams are routed based on a destination address in the IP header and not a source address. However, datagrams being directed at the mobile unit 100 requires the mobility support facility. The first time a mobile unit 100 completes its association handshake with the AP 102 or 104, the subnet where the AP 102 or 104 is attached to becomes the mobile unit's home subnet and the AP 102 or 104 becomes the mobile unit 100's home agent. If the mobile unit 100 roams within the home subnet, the AP 102 or 104 which is newly associated with the mobile unit 100 becomes its home agent. In this manner, as long as the mobile unit 100 remains in the home subnet, datagrams destined to the mobile unit 100 will be delivered to it by using a standard IP routing mechanism.

As the mobile unit 100 roams (shown now as the mobile unit 130) and associates with an AP on a subnet other than its home subnet such as the APs 132 or 134, the mobile unit 100 is "visiting" a foreign subnet and the AP 132 or 134 associated with the foreign subnet becomes its foreign agent. If the mobile unit 130 roams within the foreign subnet or to another foreign subnet, the AP 132 or 134 which is newly associated with the roaming mobile unit 130 then becomes a foreign agent for the roaming mobile unit 130.

When away from home, the mobile unit 130 obtains a care-of address such as the IP address of its foreign agent, and uses its foreign agent to register this address with its home agent so that datagrams destined for the mobile unit 130 are forwarded to the foreign agent and then to the mobile unit 130 using the tunneling process. After the foreign agent succeeded in exchanging registration messages with the home agent, datagrams arriving at the home subnet for the mobile unit 130 are encapsulated by its home agent and sent to its foreign agent. Encapsulation refers to a process of enclosing an original datagram as data inside another datagram with a new IP header. Upon receiving the encapsulated datagram, the foreign agent strips off an outer header to reveal the original datagram and delivers it to the mobile unit 130 on the foreign subnet.

As an alternative for a care-of address, the mobile unit 130 may obtain a co-located care-of address by BOOTP/DHCP. The registration occurs between the mobile unit 130 and the home agent. The mobile unit 130 becomes the end of the tunnel and itself performs the decapsulation of the datagrams. Finally, when the mobile unit 130 detects that it has returned to its home subnet, it performs a deregistration process with its home agent.

Figure 2A:
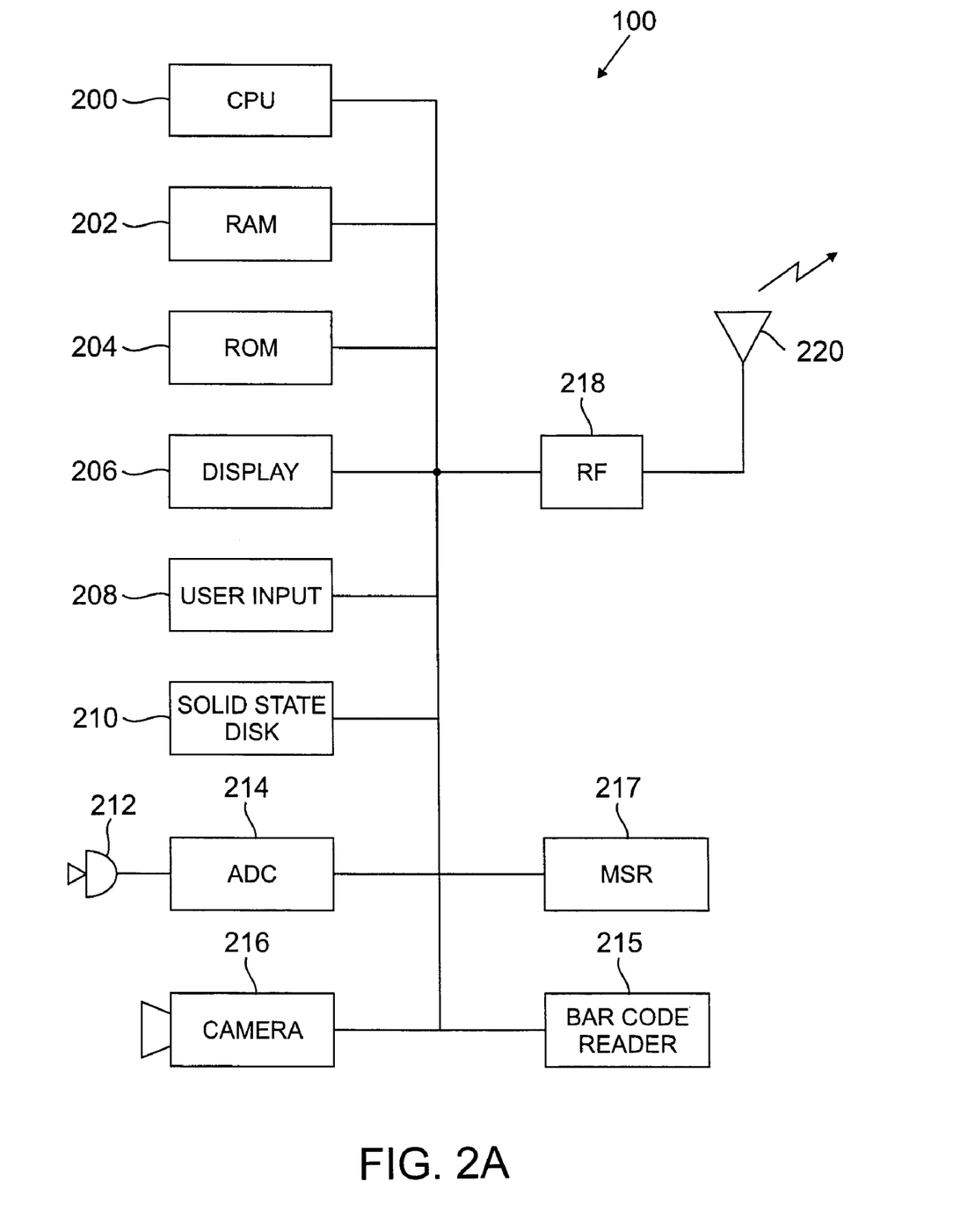
FIG. 2A is a schematic illustration of a mobile unit of FIG. 1.

Referring now to FIG. 2A, a schematic diagram of one embodiment of the mobile unit 100 or 130 is shown in more detail. The mobile unit 100 or 130 has a central processing unit (CPU) 200 which is connected using a bus to various memory devices, including a random access memory (RAM) device 202 and a read-only memory (ROM) device 204. Additionally, the CPU 200 is connected to a display device 206. The display device 206 may suitably be a liquid crystal display (LCD) device, an array of light-emitting diodes (LEDs), or a hard copy device such as a printer.

Moreover, the display device 206 may have a touch-sensitive screen.

Additionally, one or more manual input devices 208 such as a pen or stylus, a mouse or a keyboard may be connected to the CPU 200. Alternatively, an optional pop-up keyboard may be programmed to appear on the touch-sensitive screen of the display 206 to allow keyed data entry without requiring an external keyboard. The pop-up keyboard may provide a selection of soft keys on the screen which emulate a standard keyboard. Using the pop-up keyboard, a user simply taps the desired soft-key with a pen.

To buffer large quantities of data, a solid state disk 210 may be connected to the CPU 200. The solid state disk 210 may buffer voice data or video data, among others. The voice data is captured by a microphone 212 whose output is digitized by an analog to digital converter (ADC) 214. The output of the ADC 214 is provided to the CPU 200 for processing. A camera 216 may also be provided to capture still or video images which are sent to the CPU 200 for analysis as well as the solid state disk 210 for storage.

Further, to provide automatic data capture capability for various inventory and point-of-sale applications, a bar code reader 215 and a magnetic stripe reader (MSR) 217 may be connected to the CPU 200. The bar-code reader 215 may be laser-based and may be of any type well known in the art which generates and scans a visible beam across a bar code with an oscillating mirror or like device. Such a bar code reader may use a photodiode to detect the scanned beam which is reflected off the bar code and provides the detected signal for subsequent processing and decoding to generate data denoted by the target bar code. Alternatively, a charge-coupled-device (CCD) type scanner may be used. The CCD type scanner emits a sheet of light onto the target bar code and detects a reflected signal using a linear CCD array for capturing the bar code information.

With the magnetic stripe reader 217, card data may be converted to keyboard scan codes for transmission to the CPU 200. Moreover, an auto detection capability from the CPU 200 allows a full keyboard to be emulated, thus avoiding the requirement that a keyboard be attached. The magnetic stripe reader 217 reads data from cards which have been magnetically encoded in accordance with several standards. In one standard called an ANSI/ISO standard, three tracks are defined in accordance with their location on the card, each of which is used for different purposes. The magnetic stripe reader 217 may be a single track, a dual track, or a three track device which allows reading a wide range of data, including credit/debit cards and driver licenses.

The CPU 200 is also connected to an RF transceiver 218 for transmitting and receiving data using a wireless LAN. The RF transceiver 218 is connected to an antenna 220 for transmitting data to one of the APs 102, 104, 132, or 134. The wireless LANs may also use infrared (IR) transmissions. Infrared transceivers can use either a directed beam or a diffused infrared beam, while radio transceivers can use standard narrowband radio, FHSS or DSSS.

Figure 2B:
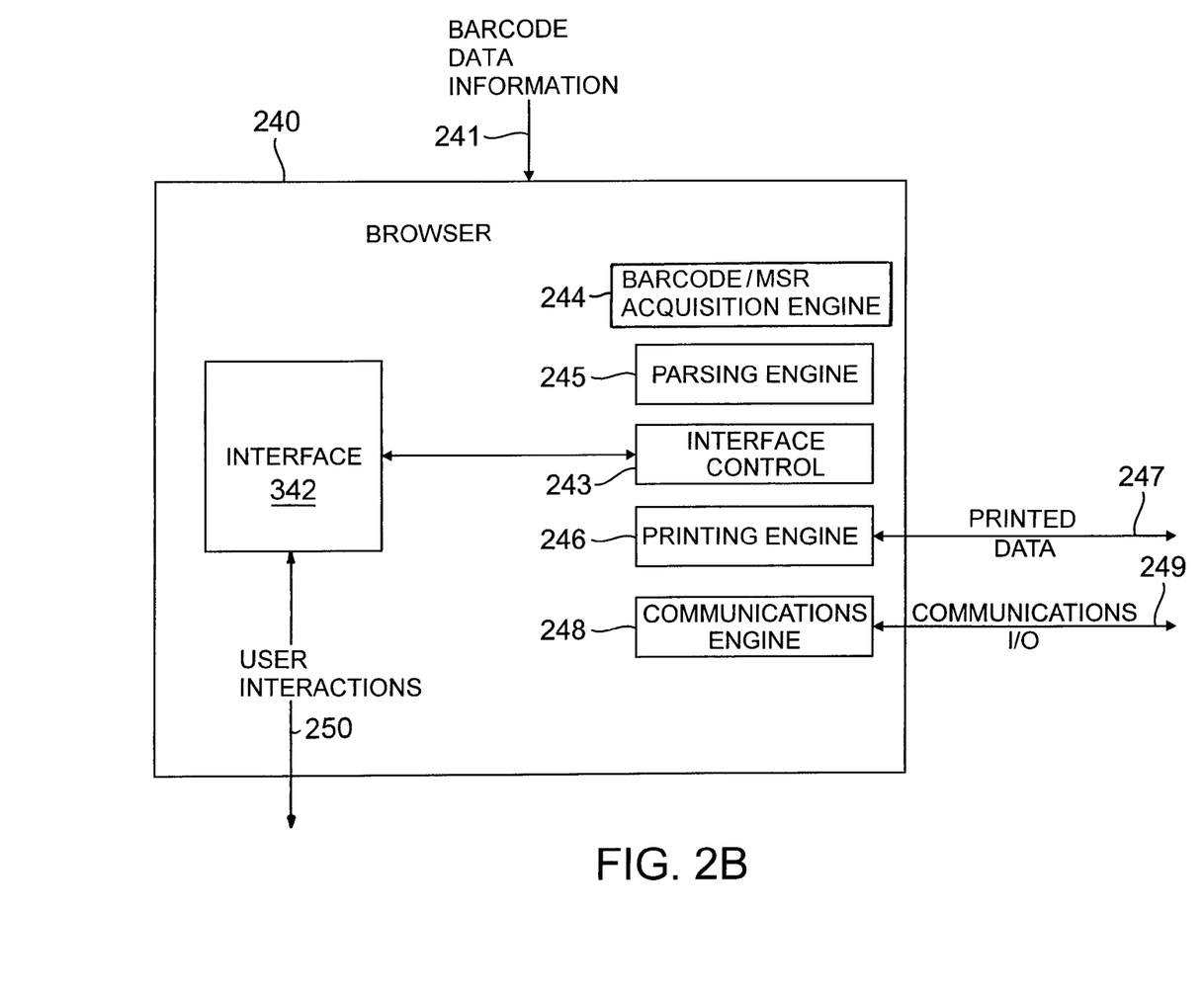
FIG. 2B is a schematic illustration of software modules executing on the mobile unit.

FIG. 2B shows various software modules on the mobile unit 100 in more detail. The system includes a browser 240 to which bar code information 241 is input. An interface 242 is constructed at run time and an interface control 243 is provided. The browser 240 further includes a bar code and MSR acquisition engine 244, a parsing engine 245, a printing engine 246 with a printed data interface 267 and a communications engine 248 with a communications input/output interface 249. The user interacts with the interface via a further interface 250.

FIGS. 3–9 show flowcharts associated with a registration process executing on the mobile unit 100 or 130 and on the AP 102, 104, 132 or 134.

After the mobile unit 100 or 130 determines that it has moved to a subnet which is different from its home subnet, the mobile unit 100 or 130 registers with its home agent to request forwarding of services. As explained in more detail below, the registration procedure is as follows:

1. The mobile unit sends a registration request packet to its foreign agent.
2. The foreign agent processes the request and then relays it to the home agent.
3. The home agent sends a registration reply to the foreign agent to grant or deny the request.
4. The foreign agent processes the reply and then relays it to the mobile unit.

When a mobile unit changes its foreign agent, that is, when the mobile unit is roaming within the foreign subnet or to another foreign subnet, the re-registration process is repeated to maintain an accurate mobility binding list.

In FIGS. 3–9, a default home agent is defined in an initialization file on the mobile unit 100 or 130, whereas the foreign agent for the mobile unit 100 or 130 is dynamically assigned. The AP with which the mobile unit 100 or 130 associates in its home subnet will be the mobile unit's home agent. The home subnet is determined by performing a logical AND between the subnet mask and the mobile unit's own IP address. Whenever a mobile unit 100 or 130 roams, it receives an Agent Advertisement packet from its newly associated AP. If the mobile unit 100 or 130 determines that it is still located at the home subnet, this new AP becomes its new home agent. If the mobile unit 100 or 130 has moved to a subnet other than its home, this new subnet becomes its foreign subnet and this new AP becomes its new foreign agent. If the first AP with which the mobile unit associates is not in its home subnet, the mobile unit is visiting in a foreign subnet and may not be reachable. The mobile unit 100 or 130 then attempts to register itself with the default home agent defined in the initialization file through the foreign agent to start a packet forwarding process.

Figure 3:
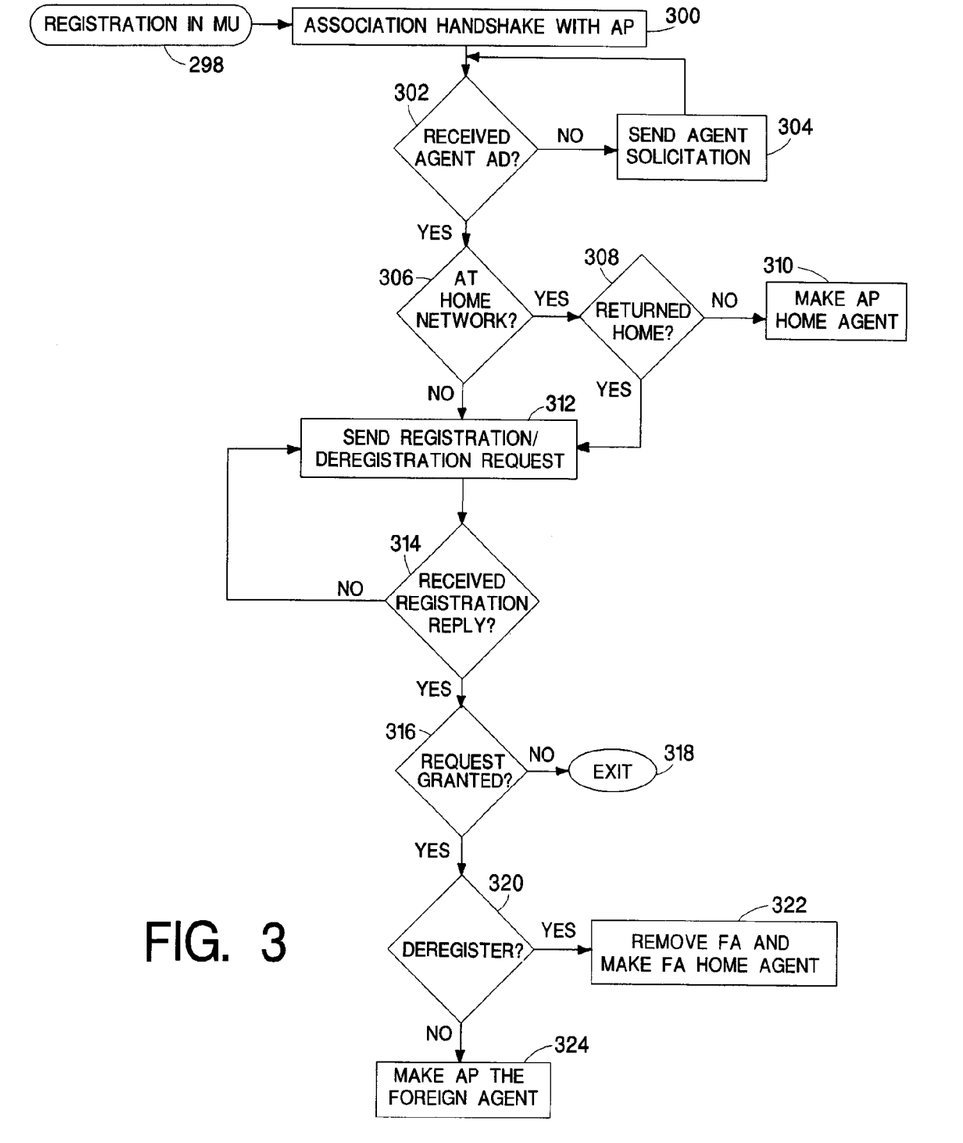
FIG. 3 is a flow chart illustrating a registration process in the mobile unit.

Referring now to FIG. 3, a process 298 to perform registration in the mobile unit 100 or 130 is detailed. Upon completion of an association handshake with an AP in step 300, the mobile unit determines whether it has received an agent advertisement packet in step 302. If not, the mobile agent sends an agent solicitation packet to the AP in step 304. Alternatively, in the event that an agent advertisement packet had been received in step 302, the mobile unit determines whether it is residing at a home network in step 306. If so, the mobile unit further checks whether it has returned to its home base in step 308. If not, the mobile unit updates its table to indicate that the AP will be its home agent in step 310.

From step 306, in the event that the mobile unit is not at home, the process of FIG. 3 proceeds to step 312 where it generates a registration request packet. Similarly, from step 308, in the event that a mobile unit had just returned home, the process of FIG. 3 generates and sends a deregistration request packet in step 312. The formats of the registration request packet and the registration reply packet are similar to those described in the standard Mobile IP specification, except that an identification field is set to blank, and an extension field is eliminated.

From step 312, the process of FIG. 3 waits for a registration reply packet from that AP in step 314. Once the registration reply packet has been received, the process of FIG. 3 further checks whether the registration request packet has been granted in step 316. If not, the process of FIG. 3 exits in step 318. Alternatively, in the event that the registration reply packet was received and that the request has been granted, the process of FIG. 3 further determines whether the reply is a registration or a deregistration action in step 320. If it is a registration action, the mobile unit updates its table to make the current AP the foreign agent in step 324. Alternatively, if it is a deregistration action, the mobile unit removes the foreign agent from its table and makes the current AP the host agent in step 322.

Figure 4:
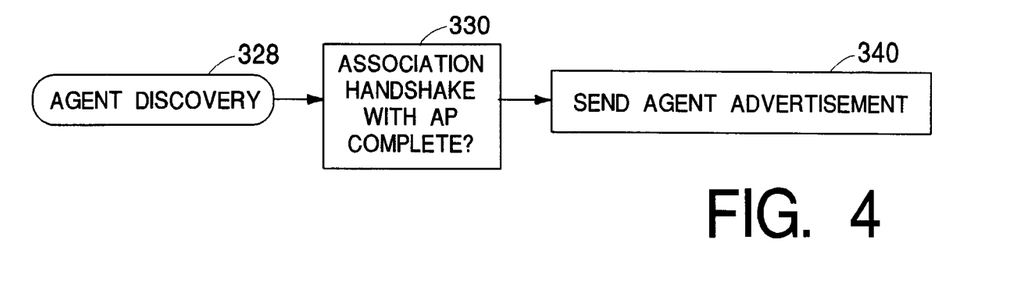
FIG. 4 is a flow chart of an agent discovery process in an access point of FIG. 1.
Figure 5:
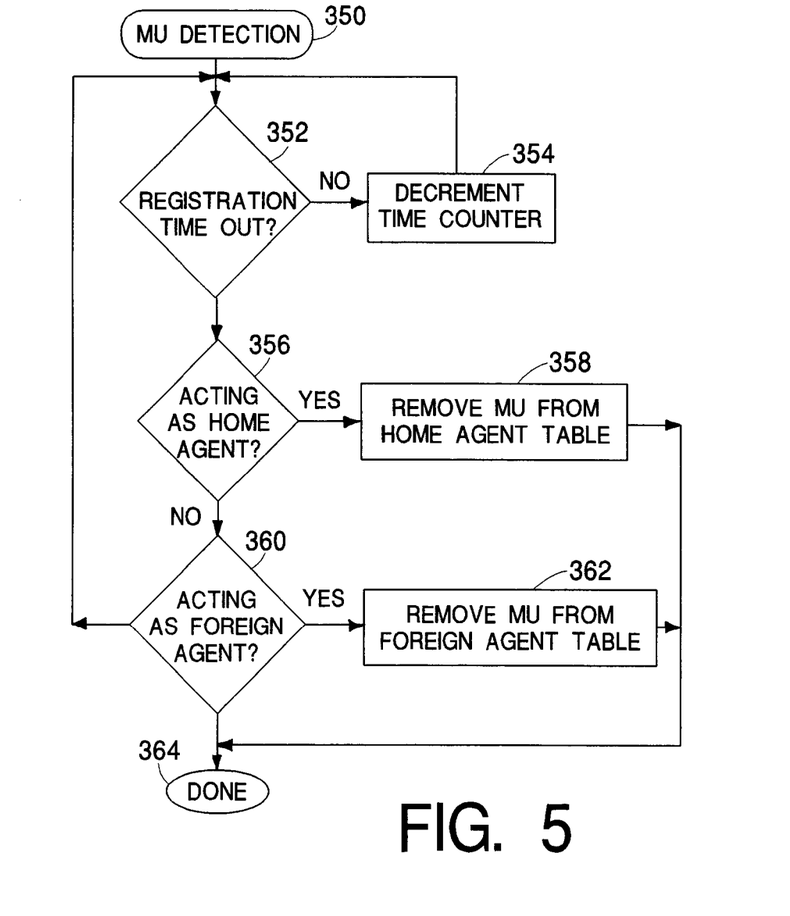
FIG. 5 is a flow chart illustrating a mobile unit detection process in the access point.
Figure 6:
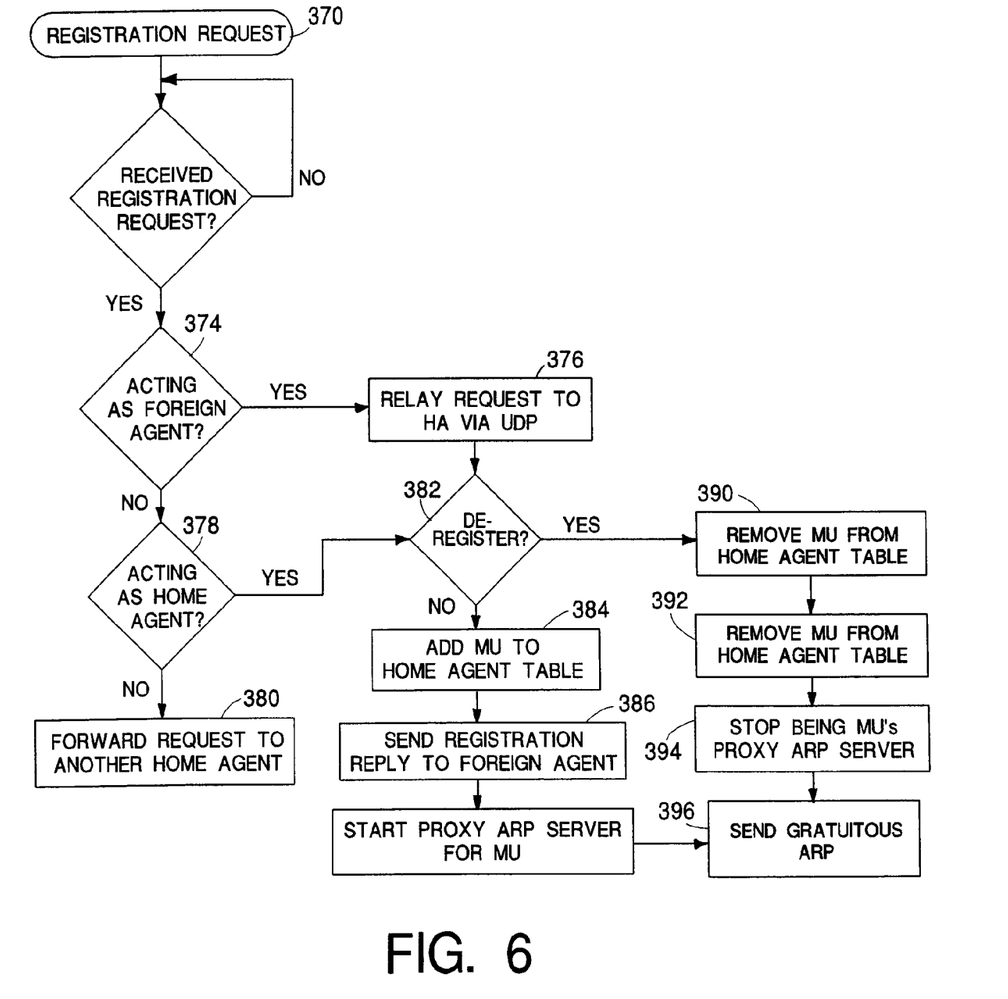
FIG. 6 is a flow chart illustrating a registration request process in the access point.

Referring now to FIGS. 4–6, various processes for performing registrations in the AP are shown. A registration request may be used to inform a mobile unit's home agent of its current care-of address, to modify a mobility binding table for the mobile unit and to de-register when the mobile unit returns home. Therefore, registration requests are generated by the mobile unit in one of the three conditions: (1) upon receipt of an agent advertisement indicating that it has moved to a subnet other than its home subnet, (2) upon receipt of an agent advertisement indicating that it has changed foreign agent, or (3) upon receipt of an agent advertisement indicating that it has moved from a foreign subnet back to its home subnet. A registration expires if it is not re-registered or de-registered in a timely manner.

For each pending registration, the mobile unit maintains the following information:

- a link-layer address of the foreign agent to which the Registration Request was sent
- an IP destination address of the Registration Request (home agent's IP address)
- a care-of address used in the registration Correspondingly, the foreign agent maintains a visitor list entry containing the following information:

- a link-layer address of the mobile unit
- a mobile unit's home address
- a mobile unit's care-of address
- a user datagram protocol (UDP) port number
- an IP address of the mobile unit's home agent Moreover, the home agent maintains a mobility binding list entry containing the following information:

- a link-layer address of the mobile unit
- a mobile unit's care-of address
- a mobile unit's home address Registration replies are received by the mobile unit in response to its registration requests. A registration reply indicates that the registration request has been accepted or denied by the foreign agent or is denied by the home agent. If the registration reply has not been received within a predetermined time, the mobile unit sends another registration request to the AP currently serving the mobile unit.

In the registration process, the foreign agent only relays the registration requests and replies between the mobile unit and the home agent. However, it does not originate any registration requests or replies.

If the home agent accepts a registration request, it then updates its record of mobility binding for the mobile unit and sends a registration reply with a predetermined code. If the home agent denies the request, it sends a registration reply with an appropriate code specifying the reason of denial. When the registration reply is in response to a deregistration request, the home agent sends the reply directly onto the mobile unit's home subnet because the mobile unit is now at home.

When visiting at a foreign network, the registration process establishes the routing necessary for delivering datagrams to the mobile unit correctly. When an incoming datagram arrives at a mobile unit's home subnet, if the mobile unit is away from home, its home agent intercepts the datagram, compares the IP destination address to its mobility binding list to see if the address matches with one of its registered mobile units and if so, tunnels the datagram to the mobile unit's currently registered care-of address. Upon receipt of an encapsulated datagram, a foreign agent compares the inner destination address to the entries in its visitor list and if a match is found, the foreign agent forwards the decapsulated datagram to the mobile unit. If no match is found, the datagram is simply discarded.

In FIG. 4, an agent discovery process 328 is shown. In the agent discovery process 328, when an association handshake with the mobile unit has successfully completed operation in step 330, the process of FIG. 4 then sends an agent advertisement packet to the mobile unit in step 340.

Turning now to FIG. 5, a process 350 for detecting a mobile unit is shown in more detail. In FIG. 5, the process first determines in step 352 whether a registration has expired. If not, a timer counter is decremented in step 354 and the process loops back to step 352 to continue checking on the registration. If the registration process had timed out in step 352, the process of FIG. 5 further checks whether the current AP is serving as a home agent in step 356. If so, the AP removes the mobile unit from its home agent table in step 358. Alternatively, in the event that the current AP is not acting as home agent, the process of FIG. 5 further checks whether the current AP is acting as a foreign agent in step 360. If so, the current AP removes the mobile unit from its foreign agent table in step 362. Alternatively, in the event that the current AP is neither a home agent nor a foreign agent, the process of FIG. 5 loops back to step 352 to repeat the mobile unit detection process.

Turning now to FIG. 6, the process for analyzing a registration request 370 is shown. Initially, the process of FIG. 6 determines whether it has received a registration request in step 372. If not, the process of FIG. 6 is idled until a registration request has been received. Upon receipt of the registration request, the process of FIG. 6 proceeds to step 374 where the AP checks whether or not it is acting as a foreign agent. If so, the AP relays request to the home agent via the UDP protocol in step 376. This is done by writing a datagram to a user datagram protocol (UDP) port, which is encapsulated as either an Internet protocol (IP) version 4 (IPv4) Datagram or a IPv6 Datagram. The datagram is then sent to its destination. Each UDP datagram has a length and the datagram may be considered a record. If a datagram reaches its final destination correctly, the length of the datagram is passed to the receiving application. UDP provides a connectionless service and therefore there is no long term relationship between a UDP client and the server.

Alternatively, in the event that the AP is not acting as a foreign agent, the process of FIG. 6 checks whether or not the AP is acting in the capacity of a home agent in step 378. If not, the request is forwarded to the home agent indicated in the request for processing in step 380. Alternatively, if the current AP is acting as a home agent in step 378, the process of FIG. 6 further checks whether the current AP is to perform a registration or a deregistration of the mobile unit. In the event that a registration process is to be performed in step 382, the process of FIG. 6 proceeds to step 384 where it adds a reference to the mobile unit in its home agent table. From step 384, the current AP sends the registration reply packet to the foreign agent in step 386.

In order to support forwarding of packets to a roaming unit, the home agent has to be able to intercept datagrams addressed to the mobile unit registered in its mobility binding list. This interception is enabled by a proxy Address Resolution Protocol (ARP) and a gratuitous ARP enable this interception. The ARP maps an IPv4 address into a hardware address, such as an Ethernet address. ARP is normally used on broadcast networks such as Ethernet, token ring and fiber-distributed data interface (FDDI), but is not needed on point-to-point networks. Typically, the source station resolves a destination MAC address of the appropriate destination by broadcasting a packet with the ARP request into the broadcast domain to which the source station is attached.

The ARP essentially broadcasts a request on a local subnet and requests that a unit with a particular IP address identify itself and tell the recipient's hardware address to the requester. The broadcasting thus locates a server on the local subnet when the server is assumed to be on the local subnet but its unicast IP address is unknown. This process is sometimes called resource discovery.

The ARP request contains the destination station's IP address (for local stations) or the IP address of the default router (for remote stations). The intended node replies with its MAC address encapsulated within an ARP response. The source station uses this information to resolve the destination MAC address of the frame. To minimize unnecessary traffic, the mappings between an IP address and a MAC address are stored locally in an ARP cache. The ARP cache is maintained for a prescribed period depending on the implementation of the TCP/IP protocol.

While a mobile unit is registered on a foreign subnet, the home agent will use the proxy ARP to answer all ARP requests on behalf of the mobile unit. The home agent also uses gratuitous ARP to update the ARP caches of hosts on the mobile unit's home subnet. The procedure is then reversed when the mobile unit returns home. Hence, the AP starts a proxy ARP server for the mobile unit in step 388. This proxy ARP server essentially diverts data intended for the mobile unit to the appropriate home agent. From step 388, the process of FIG. 6 then sends a gratuitous ARP to all hosts in the home network in step 396.

From step 382, in the event that the AP is to perform a deregistration process, the mobile unit is removed from the AP's home agent table in step 390. Next, a registration reply is sent to the mobile unit in step 392. Finally, the AP stops being the mobile unit's proxy ARP server in step 394 and it sends a gratuitous ARP message in step 396 to complete the deregistration requests process of FIG. 6.

Figure 7:
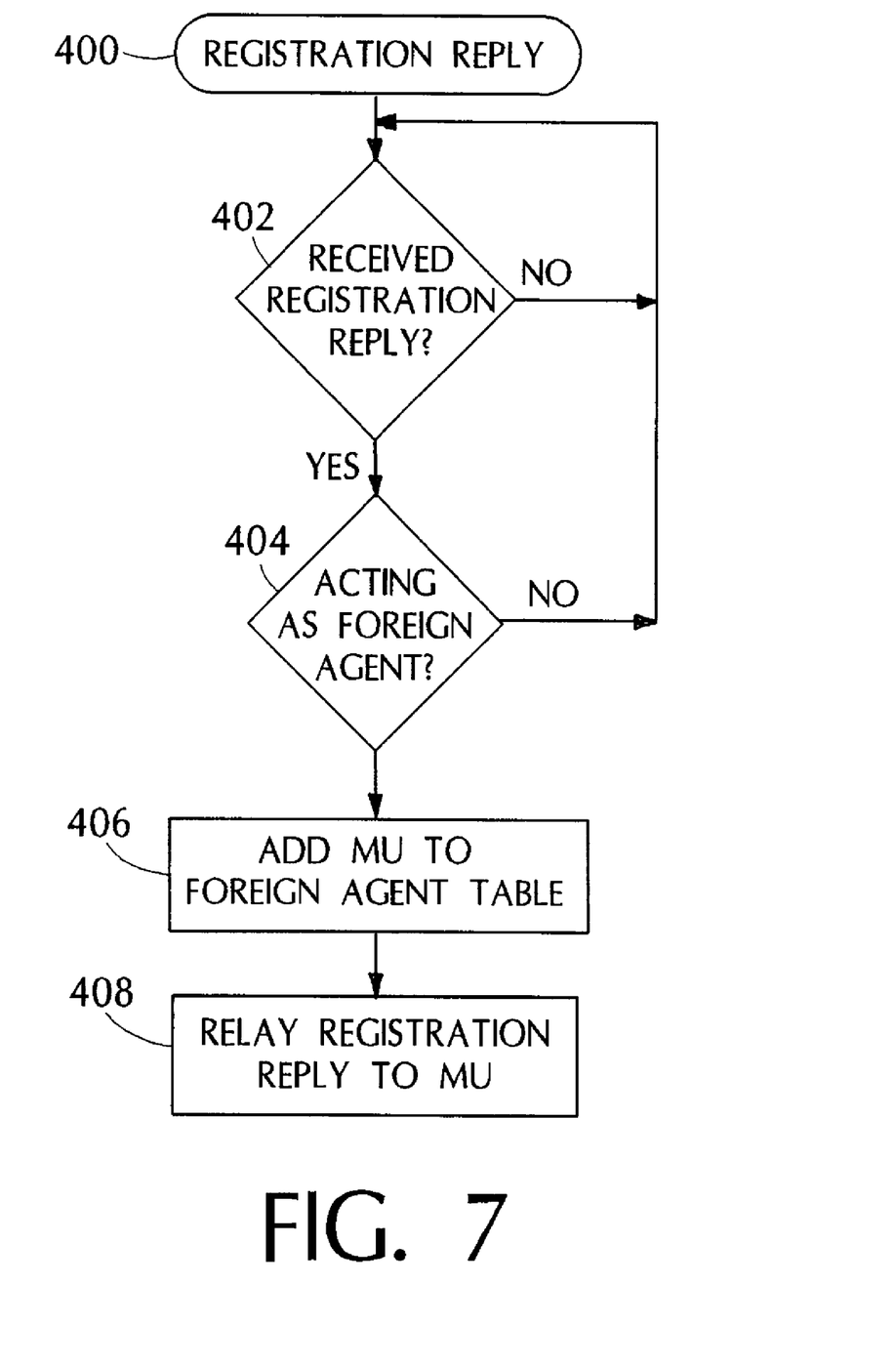
FIG. 7 is a flow chart illustrating a registration reply process in the access point.

Turning now to FIG. 7, a registration reply process 400 executing on the AP is shown. Initially, the AP checks whether it has received a registration reply packet from the home agent in step 402. If not, the process of FIG. 7 remains idle at this step until a registration reply packet has been received. Upon receipt of the registration reply packet, the current AP checks whether it is acting as a foreign agent in step 404. If not, the process of FIG. 7 loops back to step 402 to restart the registration reply process.

Alternatively, in the event that a registration reply packet has been received and the AP is acting as a foreign agent, the reference to the mobile unit is added to its foreign agent table in step 406. Further, a registration reply to the mobile unit is relayed in step 408.

Figure 8:
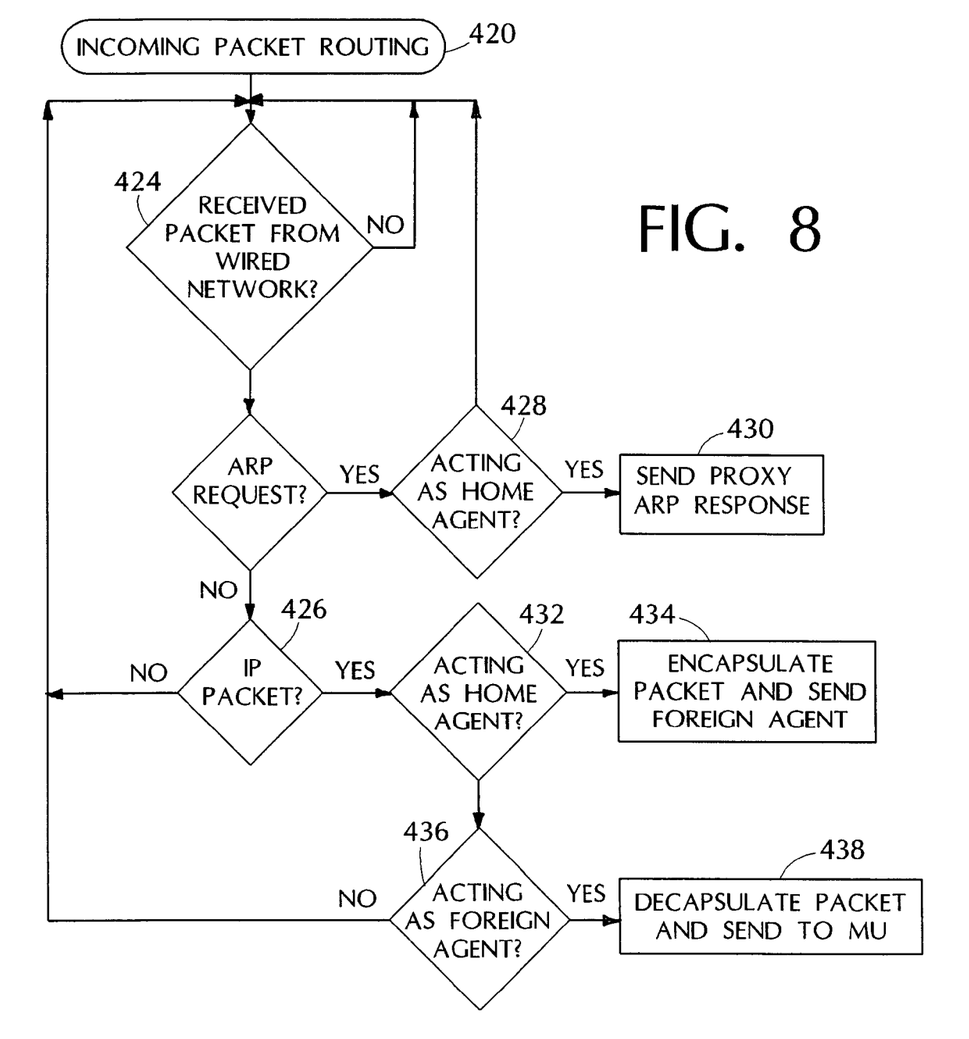
FIG. 8 is a process illustrating an incoming packet routing process in the access point.
Figure 9:
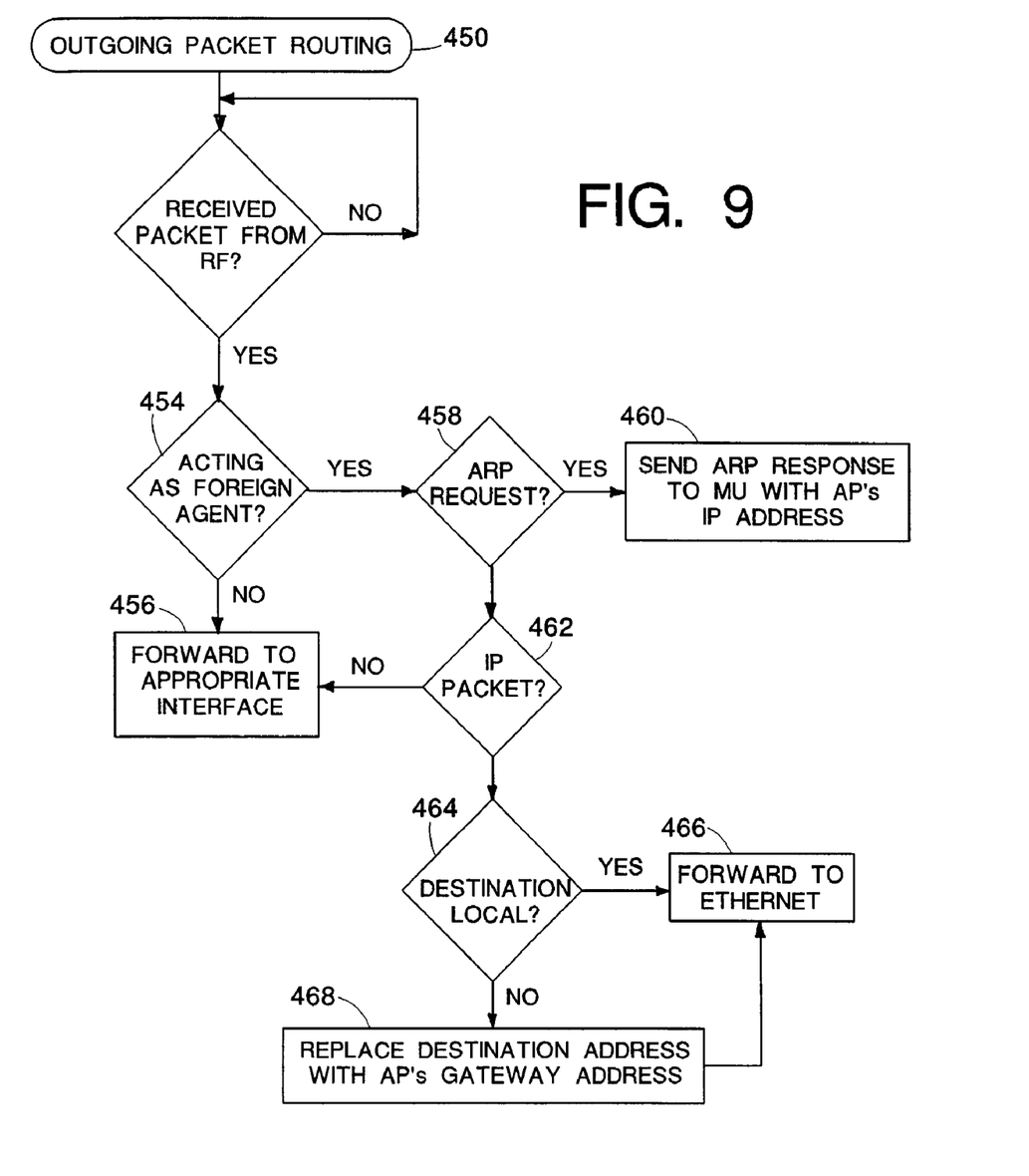
FIG. 9 is a flow chart illustrating an outgoing packet routing process in the access point.

FIGS. 8 and 9 illustrate the process for routing incoming and outgoing packets in the AP, respectively. In FIG. 8, the incoming packet routing process 420 is detailed. Initially, the process of FIG. 8 checks whether it has received a packet from a wired network such as from the Ethernet network in step 422. If not, the process is idled at step 422 until a packet has been received from the wired network. From step 422, the process of FIG. 8 checks whether the requesting packet is an ARP request in step 424. If so, the process of FIG. 8 further checks whether or not the current AP is acting as a home agent in step 428. If the AP is not acting as home agent, the process loops back to step 422 to repeat the incoming packet routing process. Alternatively, if the current AP is acting as the home agent in step 428, a proxy ARP response is sent in step 430.

From step 424, in the event that the request packet is not an ARP request packet, the process of FIG. 8 further checks whether the packet belongs to an Internet Protocol packet format in step 426. If not, the process of FIG. 8 loops back to step 422. Alternatively, if the packet is an Internet Protocol packet, the process of FIG. 8 further checks whether the current AP is acting as a home agent in step 432. If so, it encapsulates the packet with additional information such as an appropriate forwarding address. The encapsulated packet is then sent to the foreign agent in step 434. From step 432, in the event that the AP is not acting as the home agent, the AP further checks whether it is acting as a foreign agent in step 436. If the AP is neither a home agent nor a foreign agent, the process of FIG. 8 loops back to step 422 to continue the processing of incoming packets. Alternatively, in the event that the current AP is acting as a foreign agent, the process of FIG. 8 proceeds to step 438 where it decapsulates the packet by removing the forwarding information and sending this information to the mobile unit in step 438.

Turning now to FIG. 9, the process for routing outgoing packets in the AP is detailed. In FIG. 9, the process waits until it has received a packet from the radio frequency band, i.e., for a transmission from a mobile unit in step 452. If there is no such transmission, the process loops back to step 452 until a packet has been received. Once a radio frequency based packet has been received, the AP checks whether or not it is acting as a foreign agent for that mobile unit in step 454. If not, the packet is forwarded to an appropriate interface in step 456. Two interfaces may be involved—a wireless interface over RF bands and a wired interface over the Ethernet. If the packet's destination is another mobile unit that is associated with the same AP, packets are simply forwarded to the other mobile unit which is within range of the AP. Thus, there is no need to transfer the packet using the Internet. Alternatively, if the packet is associated with another AP or a wired host, then the packet has to be sent through the Ethernet.

Alternatively, in the event that the current AP is acting as the foreign agent in step 454, the AP then checks whether or not the packet is an ARP request in step 458. If so, the ARP response is sent to the MU with a default address of the current AP's Internet Protocol address in step 460.

From step 458, if the packet is not an ARP request type, the AP then checks whether or not the packet is an Internet Protocol packet in step 462. If not, the packet is forwarded to the appropriate interface in step 456.

Alternatively, in step 462, in the event that the packet is the Internet Protocol packet, the AP further checks whether or not the destination is a local or a remote destination in step 464. If the destination is local, the AP simply forwards it to the local wired network in step 466. Alternatively, in the event that the destination is a remote location, the destination address is replaced with the AP's gateway Internet Protocol address in step 468 before it is forwarded to the local wired network for processing in step 466.

In the manner discussed above, the mobile unit may freely roam about even though it is assigned to a unique, fixed Internet address which is tied to a fixed location. Datagrams are automatically routed to the unit anywhere in the world where corresponding local networks are available, regardless of its position. Datagrams destined for the roaming unit would be delivered, even though the unit may have roamed outside of its home network. Moreover, the unit does not need to change its IP address when it moves to a new network. Thus, the fixed IP address is retained to ensure compatibility with existing protocols. Further, the mobility support capability is provided without requiring any changes to the mobile unit.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

What is claimed is:

1. A method for routing information in a data communications system having a home network and a remote network, each of the home and remote networks coupleable to a mobile unit and one or more stationary access points, the mobile unit having a unique address and adapted to roam from the home network to the remote network, the mobile unit adapted to connect to one access point on the home network serving as a home agent, comprising:

discovering a physical location of the mobile unit using an agent advertisement packet broadcasted from an access point when the mobile unit first associates with the point;

determining whether or not the mobile unit is at the home network by having the mobile unit determine whether it receives the agent advertisement packet;

if mobile unit is not at the home network, associating the mobile unit with the access point broadcasting the agent advertisement packet as a foreign agent;

registering the mobile unit with the home agent;

encapsulating original data received by the home agent which is destined for the mobile unit;

forwarding encapsulated data to the foreign agent; and converting the encapsulated data to the original data and delivering the original data to the mobile unit from the foreign agent.

2. The method of claim 1, wherein the associating step further comprises:

handshaking with one of the access points on the remote network;

receiving an agent advertisement packet from the handshaked access point;

generating a registration request packet and sending the packet to the handshaked access point;

if the registration request packet has been granted, selecting the access point as the foreign agent.

3. The method of claim 2, wherein each access point is capable of communicating with the mobile unit when the mobile unit is within a predetermined range therefrom, further comprising selecting an optimum access point using a predetermined criterion to serve as a mobility agent.

4. The method of claim 1, further comprising selecting a predetermined access point as the home agent if the mobile unit is first activated on the foreign network.

5. The method of the claim 1, further comprising selecting one of the access points on the home network as the home agent when the mobile unit is initially activated on the home network.

6. The method of the claim 1, further comprising disassociating mobile units that do not periodically request registration.

7. The method of claim 6, wherein the home agent maintains one or more references to the mobile unit in one or more tables, wherein the mobile unit disassociating step further comprises:

waiting until a registration expires;

if the access point is serving as the home agent, removing the reference to the mobile unit from a home agent table; and if the access point is serving as the foreign agent, removing the reference to the mobile unit from a foreign agent table.

8. The method of claim 1, wherein the registering step further comprises providing a care-of address associated with the foreign agent to the home agent.

9. The method of claim 1, further comprising requesting a registration of the mobile unit with the home agent.

10. The method of claim 8, wherein the registration requesting step further comprises:

if the access point is acting as the foreign agent, relaying the request to the home agent; and otherwise, if the access point is acting as the home agent, updating the reference to the mobile unit in the home agent table.

11. The method of claim 1, further comprising sending a registration reply to the mobile unit.

12. The method of claim 11, wherein the registration reply sending step further comprises determining whether the access point is acting as a foreign agent and if so, adding the reference to the mobile unit in a foreign agent table and relaying the registration reply to the mobile unit.

13. The method of claim 1, further comprising routing an incoming packet to the mobile unit.

14. The method of claim 1, further comprising routing an outgoing packet from the mobile unit.

15. The method of claim 1, wherein each mobile unit has a unique Internet network address and a unique Media Access Control (MAC) layer protocol address, further comprising sending data over the Internet.

16. The method of claim 1, further comprising routing one or more datagrams to the mobile unit.

17. The method of claim 1, further comprising routing voice data to the mobile unit.

18. The method of claim 1, wherein the sending step further comprises transmitting data using a Transmission Control Protocol/Internet Protocol (TCP/IP).

19. The method of claim 1, further comprising routing video data to the mobile unit.

20. The method of claim 1, further comprising routing image data to the mobile unit.

21. The method of the claim 1, further comprising removing the mobility support when the mobile unit returns to the home network.

22. An apparatus for routing information to a mobile unit in a data communications system, the mobile unit having a unique address and adapted to roam about the Internet, comprising:

a home network having one or more access points for communicating with the mobile unit, one of the access points on the home network being a home agent;

a wide area network coupled to the home network;

a remote network coupled to the wide area network and having one or more access points, the mobile unit coupleable to one access point serving as a foreign agent, the foreign agent discovering a physical location of the mobile unit using an agent advertisement packet broadcasted from the access point when the mobile unit first associates with the point, determining whether or not the mobile unit is at the home network by having the mobile unit determine whether it receives the agent advertisement packet, and if mobile unit is not at the home network, the foreign agent registers the mobile unit with the home agent, encapsulates original data received by the home agent which is destined for the mobile unit, forwards encapsulated data to the foreign agent, and converts the encapsulated data to the original data and delivers the original data to the mobile unit via the foreign agent.

* * * * *

UNITED STATES PATENT AND TRADEMARK OFFICE
CERTIFICATE OF CORRECTION

PATENT NO. : 6,535,493 B1
DATED : March 18, 2003
INVENTOR(S) : Frances Lee and Gregory Ennis It is certified that error appears in the above-identified patent and that said Letters Patent is hereby corrected as shown below:

Column 4,
Line 66, after "voice", delete "10".

Signed and Sealed this

Twenty-eighth Day of October, 2003

JAMES E. ROGAN
*Director of the United States Patent and Trademark Office*